Oct. 18, 1949.     O. D. SODDERS     2,484,967
HOG FEEDER
Filed Nov. 7, 1945     2 Sheets-Sheet 1

Inventor
Ottis D. Sodders
By Clarence A. O'Brien
and Harvey B. Jacobson
Attorneys Oct. 18, 1949.    O. D. SODDERS    2,484,967
HOG FEEDER
Filed Nov. 7, 1945    2 Sheets-Sheet 2

Inventor
Ottis D. Sodders
By Clarence A. O'Brien
and Harvey B. Jacobson
Attorneys Patented Oct. 18, 1949

2,484,967

UNITED STATES PATENT OFFICE 2,484,967

HOG FEEDER

Ottis D. Sodders, Jamestown, Ohio

Application November 7, 1945, Serial No. 627,156

2 Claims. (Cl. 119—54)

This invention relates to a novel and improved hog feeder of a simple, durable and economical self-feeder type.

One object of the invention is to provide an improved feeder construction which virtually insures constant agitation of the feed as it gravitates from a hopper into underlying feed boxes or troughs.

Another object of the invention is to provide novel animal-actuated agitator means which keeps the feed in said hopper from clogging and avoids undue wasting, this by way of proper distribution into the various selectively usable troughs.

More specifically, novelty is predicated on a feed agitating shaft movably suspended in the stated hopper and reaching downwardly into a feed box which underlies and forms a base for the hopper. The feed box embodies suitably arranged partitions defining four individual feeder compartments or troughs. Longitudinally bowed animal actuated actuators are arranged in a plane with one another and bolted on the lower end portion of said shaft. The ends of the bowed portions of the actuators project into coacting troughs so that the animals, when rooting for feed in the troughs, contact the actuators in a manner to oscillate same in horizontal planes. Consequently, the movements of the actuators are transferred to said shaft to actuate the shaft and to simultaneously actuate feed agitating fingers carried by the shaft.

Other features, advantages and structural adaptions will become more readily apparent from the following description and the accompanying illustrative drawings.

In the accompanying drawings, wherein like numerals are employed to designate like parts throughout the same:

Figure 1:
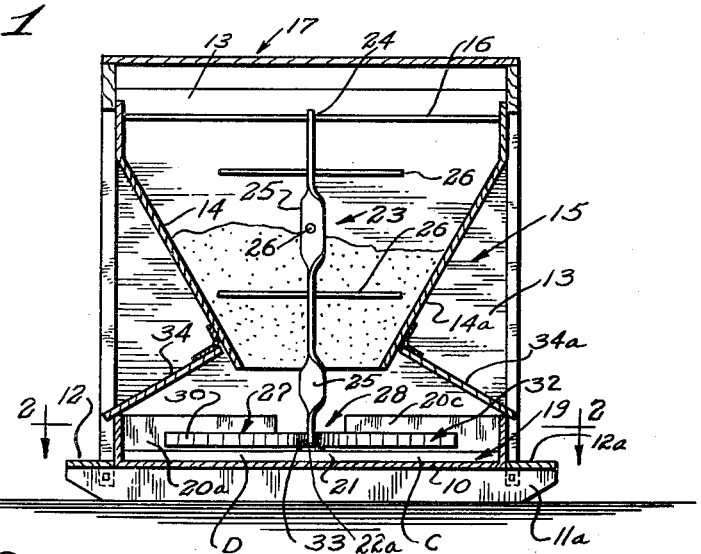
Fig. 1 is a vertical section, with parts in elevation, taken transversely thru a hog-feeder constructed in accordance with my invention, the section being on the line 1—1 of Fig. 3.

Referring now to the drawings by distinguishing reference numerals, it will be seen that a so-called floor or bottom of the exterior housing or feeder construction is denoted by the numeral 10 and is mounted on suitable runners 11, 11a and 11b for convenient sledding and shifting purposes. The ends of the runners project beyond the floor and are provided with animal steps or rails 12 and 12a.

The two end walls, which are vertical and parallel and which rise from the horizontal floor, are denoted by the numerals 13 and 13a, and between these the interiorly arranged feed-containing hopper, with its inclined walls 14 and 14a, is mounted. The hopper as a unit is referred to by the numeral 15. Mounted in the extreme upper portion of said hopper is a horizontal suspension or hanger rod 16. Supported on walls 13 and 13a is a removable roof structure 17 having its companion end portions 18 and 18a inclining outwardly and downwardly and overhanging said end walls 13 and 13a.

Figure 2:
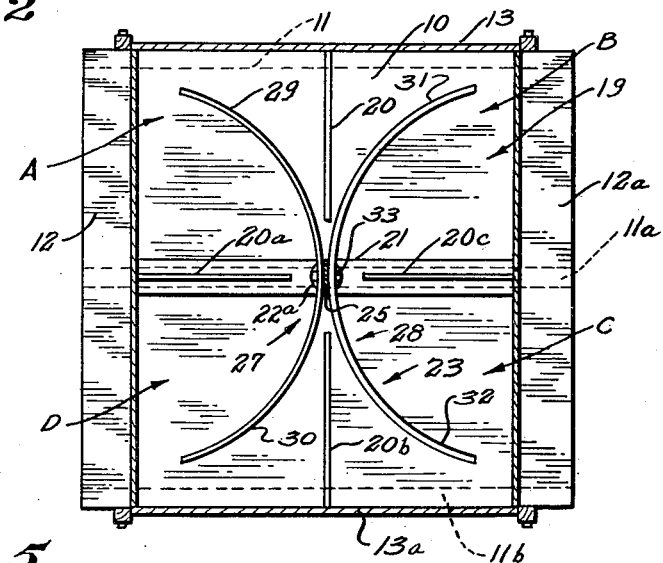
Fig. 2 is a horizontal section on the line 2—2 of Fig. 1.
Figure 5:
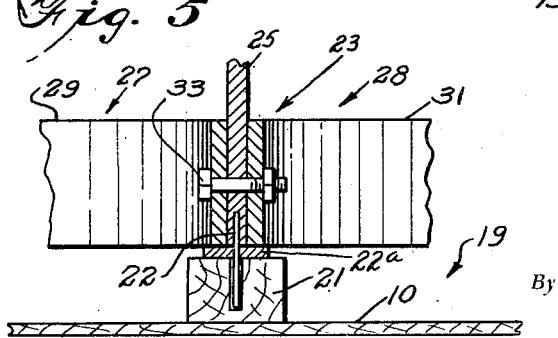
Fig. 5 is an enlarged fragmentary sectional view of one of the animal-activated actuators.
Figure 3:
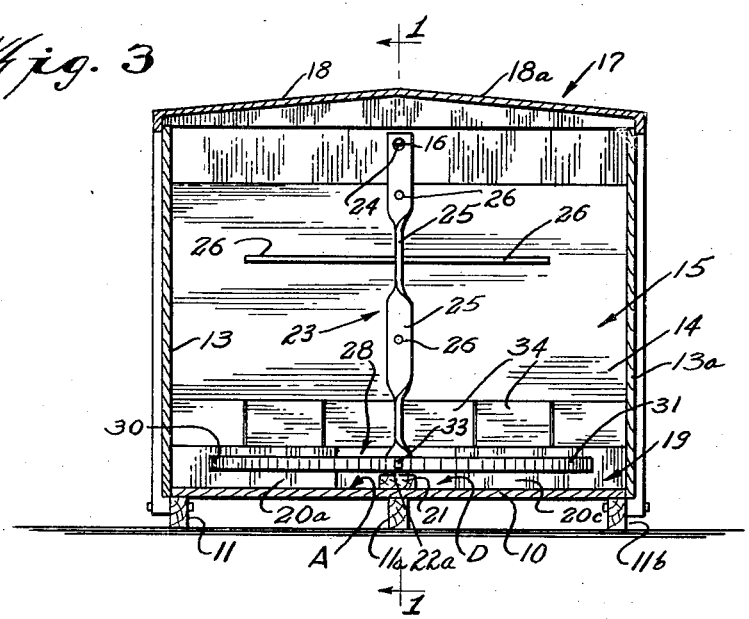
Fig. 3 is a longitudinal vertical section, with parts in elevation, at right angles to Fig. 1.

The feed boxes or troughs are disposed beneath the hopper for proper reception of proportionate amounts of feed from said hopper. Referring, for example, to Figure 2, it will be seen that a rectangular box, as a unit, is denoted by the numeral 19. It is internally divided by a series of four partitions 20, 20a, 20b and 20c into individual compartments or troughs A, B, C and D. There is a horizontal strip or rail 21 mounted in the bottom of said feed box and coacting with the spaced inner ends of the respective partitions 20 and 20b and supporting partitions 20a and 20c. This rail also serves as a mount or foundation for (see Figure 5) a pivot pin 22 which extends well above the rail at the central point indicated.

Figure 4:
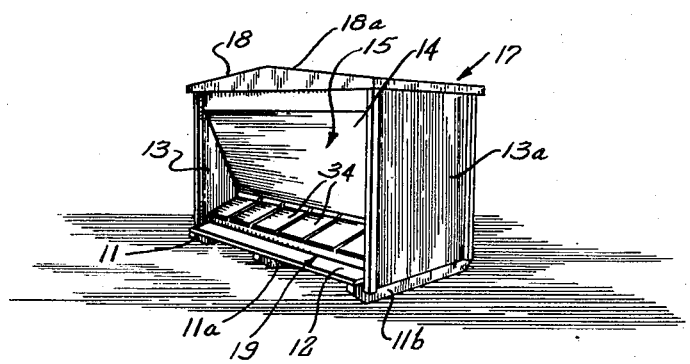
Fig. 4 is a perspective view on a small scale.

At this stage I direct attention to the agitator device, which, as a unit, is denoted by the numeral 23 and is characterized by a vertical shaft. The upper end of the latter is apertured and loosely hung, as at 24, from the hanger or suspension rod 16, thus permitting the desired rotary movement of said shaft. The laterally twisted portions 25 are provided with outstanding agitator fingers 26 which extend into the feed (not shown) in the hopper 15. The lower end portion of said agitator shaft is provided with a pair of substantially semi-circular actuators 27 and 28. The opposite free end or stirrer portions of these actuators project and operate in the respective feed boxes A—B—C and D, as shown in Figure 2. That is to say, one end of the actuator 27, the end indicated at 29, projects into the box A. The opposite end, indicated at 30, projects into the feed box or compartment D. One of the ends of the actuator 28 extends, as at 31, into the box B, and the remaining free end 32 into the box C. Due to the semi-circular formations and the arrangement of these actuators, the so-called ends 29, 30, 31 and 32 function as trips. As the hog roots into his selected trough, he continues to "nose" and move the adjacent trip about. It follows, therefore, that when a number of hogs eat from the respective troughs, they continue to jostle said actuators 27 and 28. As these are bolted, as at 33 (see Fig. 6), on the lower end portion of the agitator shaft 23, and as the pin 22 serves as an anchoring pivot, it is obvious that the agitator fingers 26 are moved sufficiently in the feed contained in the hopper 15 to keep said feed free flowing at all times. Suitable lids 34, properly arranged, inclined, and hingedly mounted (see Fig. 4) function as easy-to-open covers. Also, the outer swingable ends overhang sufficiently to expedite opening and closing.

Referring again to Fig. 5, I would point out that the stated pivoting and anchoring pin 22 is preferably secured to the lower end of the agitator shaft, fits down into an oversized socket in rail 21, and a bearing washer 22a surrounds the pin and is interposed between rail 21 and the coacting actuators 27 and 28.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual pratice so long as no departure is made from the invention as claimed.

I claim:

1. In a hog feeder of the class described, a substantially rectangular feed-receiving box, said box being internally divided by partitions into individual compartments defining troughs, a horizontal base rail mounted in said box and provided with an upstanding pivot pin, a hopper emptying into said box, a horizontal hanger rod mounted in said hopper, a vertical agitator shaft attached to and movably suspended from said hanger rod, said agitator shaft being provided with a plurality of agitator fingers, said fingers extending into said hopper, and a pair of substantially semi-circular actuators bolted to said agitator shaft, said agitator shaft being pivotally associated with said pivot pin, said actuators being so arranged as to permit the ends of the respective actuators to project into individual troughs.

2. In a hog feeder of the class described, a substantially rectangular feed-receiving box, said box being interiorly divided by partitions into individual compartments serving as hog feeding troughs, an upstanding pivot pin in the central region of said trough, a hopper mounted over and above and emptying into said box, a horizontal hanger rod supported in said hopper, a vertical feed agitating shaft operatively mounted on and movably suspended from said hanger rod, said shaft being provided with agitating fingers, said fingers serving to loosen the feed contained in said hopper, one end of said shaft being mounted for operation on said pin, and a pair of substantially semi-circular actuators operatively mounted in the same plane and in reverse positions on said shaft, the free end portions of the respective actuators projecting into adjacent pairs of troughs, whereby the hogs, when rooting into said troughs, come into contact with the actuators to actuate the shaft and agitating fingers on said shaft.

OTTIS D. SODDERS.

REFERENCES CITED

The following references are of record in the file of this patent:

UNITED STATES PATENTS

| Number | Name | Date |
|---|---|---|
| 1,321,614 | Fouts | Nov. 11, 1919 |
| 1,383,222 | Lukens et al. | June 28, 1921 |
| 1,718,472 | McCullough | June 25, 1929 |

FOREIGN PATENTS

| Number | Country | Date |
|---|---|---|
| 19,426 | Norway | Dec. 17, 1907 |
| 203,561 | Great Britain | Sept. 13, 1923 |